Patented Aug. 25, 1953

2,650,197

UNITED STATES PATENT OFFICE 2,650,197

WELL DRILLING COMPOSITION AND METHOD OF MANUFACTURE THEREOF

Henry W. Rahn, Corpus Christi, Tex.

No Drawing. Application April 21, 1953,
Serial No. 349,994

17 Claims. (Cl. 252—8.5)

This invention relates to a novel composition suitable for various uses including treatment of oil well drilling fluids and to the preparation thereof and has particular relation to the application of this composition in the drilling of oil and gas wells. This fluid is pumped down through the drill system to the bit and there issues to rise in the annular space between the drill stem and the walls of the bore hole. The fluid serves several purposes. It carries cuttings and sand working in at the base or up the bore hole to settling areas where these cuttings and rock particles settle out. Gases coming from the bore hole and entrained in the fluid bubble out in the settling areas. The fluid is then pumped back to the drill stem and the drilling cycle is repeated.

Another function of the fluid is to cool and lubricate the bit. The fluid also seals the walls of the well thereby preventing undesirable seepage of gases and liquids into the bore hole, loss of drilling fluid into the formation being drilled and caving in of the formation.

In normal drilling fluids, sufficient colloidal material such as clay, bentonite, etc., is incorporated to impart a density sufficiently high to produce adequate hydrostatic pressure. Furthermore, because of the colloidal nature of the clay and like material, the clay swells and the resulting mud is thixotropic in character. Such muds are effective in plastering the walls of the bore hole to seal off porous formations and to assist in carrying cuttings out of the hole. It is desirable that the fluid possess such thixotropic properties in order that the cuttings do not settle out and clog the bore hole in the event of temporary suspension of drilling operations.

Too much colloidal material renders the fluid too viscous, thereby making it difficult to pump. On the other hand, fluid made from clays having a deficiency of colloidal material must be improved by the addition of highly colloidal clay such as bentonite.

In addition, the drilling fluid frequently must combat formations known as heaving shale. Heaving shale is believed to be caused by the hydration of shale particles with water from the ordinary drilling fluids. It is highly sensitive to water and is highly colloidal. When present, the shale swells, disintegrates and flows into the bore hole, often clogging the drilling tools.

In order to combat this difficulty, it has been common practice to add certain agents such as sodium hydroxide and quebracho to the drilling mud. Addition of these agents serve to reduce the viscosity of the drilling fluid and also to lower its gelation. Since quebracho is a relatively expensive material, it has been considered desirable to utilize other less expensive sources of active components. Since lignite shale and lignite contain substantial quantities of humic acid, these materials have been tested for this purpose in the hope of developing a relatively cheap material for the purpose. However, when such shales are used in conjunction with an aqueous solution of sodium hydroxide or like alkali metal hydroxide, poor results are obtained.

In the first place, the lignite or lignite shale separates out of suspension rapidly. This makes it difficult or even impossible to form an aqueous suspension of the addition agents which can be added at a relatively continuous rate to a drilling fluid. Furthermore, the effective components— i. e., humic acid, etc., in lignite and lignite shale are not themselves readily dissolved when added to the alkali metal hydroxide. Consequently, very little use is made of lignite or lignite shales in drilling operations, notwithstanding the fact these materials are substantially lower in cost than is quebracho.

In accordance with the present invention, a novel oil treating composition has been provided using carboniferous minerals which contain appreciable quantities of humic acid, such as lignite, peat, or lignite shales and a novel process has been provided by which such carboniferous materials may be converted to effective well treating compositions. Thus, it has been found according to this invention that effective well treating compositions may be obtained by dispersing the carboniferous mineral, such as lignite shale, in aqueous alkali metal hydroxide solution and drying the mixture. In performing this drying operation, it is advantageous to heat the mixture for an appreciable time at an elevated temperature of above about 90° C., but below the temperature at which substantial pyrolysis of the humic acid in the carboniferous material occurs. Temperatures of 150 to 350° C. are found to be advantageous although higher and lower temperatures are permissible.

This process produces a product which is substantially dry to touch and generally contains less than about 25% by weight of water. During the drying operation, a material improvement in the product is effected. It is frequently advantageous to continue this heating operation for an appreciable time after a solid product which is dry to touch when cold has been produced. This not only effects a decreased moisture content and may even produce an essentially anhydrous product, but also insures at all events production of a material which will more effectively reduce the viscosity of drilling muds.

The resulting product which is obtained is a reaction product of the alkali metal hydroxide and the humic acid or like components of the lignite. It is readily dispersible in oil well drilling fluids and shows little objectionable tendency to settle out from the fluid. It is especially effective as a substitute for quebracho and like materials in drilling fluids which have a pH of about 8½ to about 12½.

In performing the process herein contemplated, an aqueous suspension of the lignite or lignite shale in alkali metal hydroxide is prepared and the resulting slurry is heated to evaporate water therefrom. If the slurry is sufficiently thick, it may be dried on a conventional drum dryer or a tray dryer. Alternatively, the slurry or suspension may be dried in a spray dryer.

The reactions which occur to improve dispersibility and other properties of the product are promoted by application of heat. Thus it is necessary to apply heat to achieve these results.

These reactions are relatively slow at low temperature and relatively rapid at higher temperatures. Thus in order to conduct the process at a reasonably rapid rate, the mixture of lignite water and alkali metal hydroxide should be heated above about 90° C. during at least a portion of the reaction, usually during the final drying stages thereof.

The time of heating will vary dependent upon the results desired and also upon the reactivity of the humic acid in the lignite, as well as upon the method of drying. A dry product (one which is essentially dry to touch but may contain 10 to 25% or even more of moisture) can be obtained which is suitable for use within the matter of a few seconds or at most several minutes in a drum or spray dryer. However, further heating of the product at this elevated temperature for a substantial period of time, for example ten minutes to several hours, is not objectionable. In fact, the further heated products show improved viscosity reducing power when applied to treatment of certain drilling muds which are difficult to treat. However it usually is unnecessary.

In general, it is found advantageous to digest the lignite in aqueous alkali metal hydroxide solution prior to the above described heating at about 90° C. or above. This digestion which normally is conducted above 75° C. (frequently 75–90° C.) for a period of 15 minutes to 24 hours or more, improves the dispersibility of the product and permits production of a satisfactory product even when the heating at 100° C. and above is relatively short.

The exact nature of the reactions which occur are not fully understood. It appears that sodium salts of humic acid are formed. Whether other reactions occur during the baking of the lignite with sodium hydroxide is not known. However, it has been definitely established that improved results are obtained by this drying treatment.

The amount of alkali metal hydroxide used varies considerably in accordance with the product desired. The amount of sodium hydroxide used may range from 4 parts of alkali metal hydroxide by weight per part by weight of lignite or lignite shale to 1 part of alkali metal hydroxide to 20 parts by weight of lignite shale on the other hand. For most purposes, an alkaline product is desired and in such cases, the amount of sodium hydroxide should be sufficient to exceed that required to form a neutral product (generally in excess of 0.1 part of sodium hydroxide by weight per part of lignite), but should not substantially exceed about 3 parts of sodium hydroxide per part of lignite. Such products have an alkaline reaction, i. e., the pH of an aqueous solution thereof containing 2% by weight of the product is above 7 usually in the range of 9.5 to 12, depending upon the amount (if any) of free alkali present.

Solutions of any convenient concentration of sodium hydroxide or like alkali metal hydroxide may be used, although extremely dilute solutions have the objection of containing an excessive amount of water which must be removed from the mixture, whereas solutions containing excessively high amounts of sodium hydroxide are viscous and difficult to handle. Normally, the solutions should contain at least about 5 and rarely more than 55 percent by weight of NaOH.

In order to facilitate production of a finely divided product which is granular in character, it is desirable to use lignite shale which is free from large agglomerates. Generally, the lignite used should pass a 10 mesh screen. The product thus produced likewise should be essentially free from agglomerates and if necessary may be subjected to a hammer mill or other equipment capable of effecting grinding or breaking of the material so that it is in the form of a powder or granules which are capable of passing about a 10 mesh screen. While coarser products may be used, they dissolve more slowly than do the more finely divided products.

Various types of carboniferous materials may be used. Such materials should in all events contain not less than about 10 percent by weight of humic acid as determined by extraction with aqueous sodium hydroxide solution containing 5 percent by weight NaOH at room temperature. Solutions containing in excess of 20 to 30 percent or more of humic acid are found to be preferable in this regard. Suitable lignite shales are found in naturally occurring deposits in New Mexico and other areas in the United States. Lignite, lignite shale and peat deposits normally are suitable for the purpose herein contemplated.

If desired, various tannins and tannin extracts including quebracho, wattle extract, and other conventional tannins and tannin extracts may be added to the alkali metal hydroxide-lignite composition before drying, or to the dried product after production. These agents are effective to improve the function of the addition agents at pH's above 10 to 11. Thus, it has been found that the products herein contemplated are most effective in the treatment of drilling fluids having a pH of about 8½ to about 12½. On the other hand, their effectiveness may be enhanced by the use of the tannins and tannin extracts above specified. Barks, such as wattle bark, mangrove bark, redwood bark, etc., and like materials which contain in excess of 10 percent tannin or humic acid as determined by extracting with water at room temperature also may be used with the lignite for this purpose.

The products so obtained are known to be pulverulent solids which appear homogeneous to the naked eye. They are readily dissolved or dispersed in water.

The compositions herein contemplated are effective with a large number of different drilling fluids. The most commonly used drilling fluids are comprised of an aqueous continuous phase in which are dispersed clays, such as bentonite and other clays which will form a thixotropic suspension. Weighting agents, including barytes, iron oxide and like materials frequently are present. The well treating composition described here is especially suitable for reducing the viscosity of such a suspension.

However, the composition is suitable for use with other types of drilling fluids. For example, in drilling wells of extreme depth, it is frequently advantageous to use bentonite clay in which the sodium content has been base exchanged with calcium. These calcium bentonites are very effective for the drilling of deep wells. The compositions herein described and claimed may be effectively used to reduce the viscosity of such products. In some cases, it is advantageous to incorporate some calcium hydroxide into the composition. The lime may be conveniently incorporated prior to the drying operation.

The compositions herein described also may be effectively used in connection with drilling muds in which the dispersed phase is an oil in water emulsion. Such drilling fluids are formed by dispersing bentonite and like products in an oil in water emulsion. The emulsion normally is stabilized by special emulsifying agents such as tall oil and other materials. Frequently, the cost of specially prepared emulsions is quite high.

When used in such drilling fluids, the lignite compositions described here not only serve effectively to reduce the viscosity of muds of this character but also assist in stabilizing the emulsion. Not infrequently it is possible to use ordinary diesel oil or even crude oil as the component of the fluid and effective emulsification can be achieved using the alkali metal hydroxide-lignite composition described here as the sole emulsifying agent or in conjunction with other emulsifying agents, such as tall oil.

These compositions also may be used for other purposes as agents to stabilize or improve dispersions. Thus they may be introduced into Portland cement mixtures to improve the properties thereof. They may also be used in boiler compounds, as tanning agents and for other purposes.

The following examples are illustrative:

Example I 600 pounds of lignite shale and 800 pounds of an aqueous solution containing 50 percent by weight of NaOH were mixed together. The product was heated to a temperature of 90 to 100° C., diluted with water to produce a solution having a specific gravity of 50 to 70° Twaddell, and was delivered to a drum dryer which was heated by 100 pound steam to a temperature of approximately 170° C. while the drum was rotated at about 2 R. P. M. The resulting product was hammer milled to produce a coarse granular product capable of passing a 10 mesh screen. This product contained approximately 10.2 percent of water based upon the total weight of the composition. The amount of available alkali present, computed by titration to methyl orange endpoint, was about 37 percent by weight expressed as NaOH.

A synthetic drilling mud was prepared by suspending "Ezmix" clay which is a West Texas native clay, considered resistant to salt contamination and having swelling characteristics commonly used in Texas oil fields to produce drilling fluids. The suspension prepared contained 23.7 percent by weight of this clay. Such a mud is more difficult to treat than most of the muds used in conventional drilling muds.

Portions of the lignite-caustic reaction product prepared, from 1.5 parts lignite shale to 1 part sodium hydroxide as described in this example, were baked 2.1 hours at 240–260° C. and 8.5 hours at 243–260° C. respectively. The viscosity of samples of the above synthetic mud was measured using various quantities of the unbaked drum dried lignite-caustic composition and of the two baked compositions. The results are indicated in the following table:

| Amount (Expressed in terms of available alkalinity of product as Lbs. of NaOH per barrel of mud) | Viscosity in Centipoises at 600 R. P. M. | | |
|---|---|---|---|
| | Unbaked | Baked | |
| | | 2.1 hours | 8.5 hours |
| 0 | 64 | 61 | 61 |
| 0.25 | 84 | 77 | 75 |
| 0.5 | 72 | 69 | 66 |
| 0.75 | 62 | 55 | 52 |
| 1.0 | 69 | 44 | 44 |
| 1.5 | 104 | 27 | 22 |
| 2.0 | 98 | 16 | 15 |
| 2.5 | 68 | 7 | 5 |
| 3.0 | 35 | 3.5 | 2.5 |

It will be noted that all of the above products reduce the viscosity if sufficient material is added. Attention is directed to the fact that the baked materials which were subjected to an additional baking of 2.1 and 8.5 hours, respectively show a material improvement in viscosity reducing characteristics. This clearly shows the advantage of continuing the heating operation for some period of time. The baked products were essentially anhydrous. However, such further baking is not necessary with many muds, the initial unbaked material being satisfactory.

Example II 300 grams of lignite shale and 400 grams of aqueous sodium hydroxide solution containing 50 percent by weight of NaOH were mixed together and heated in an oven at 180° C. for 16 hours. The available alkali content of this material, as determined by titration to the methyl orange endpoint, was determined to be 46.63 percent by weight, computed as NaOH.

Using a mud of the type described in Example I, the viscosity reducing characteristics of the material thus produced were determined with various amounts of the material. The results were as follows:

| Amount (Expressed in terms of available alkalinity determined as Lbs. of NaOH as barrel of mud) | Viscosity in Centipoises |
|---|---|
| 0 | 64 |
| 0.25 | 75 |
| 0.5 | 67 |
| 0.75 | 58 |
| 1.0 | 46 |
| 1.5 | 36 |
| 2.0 | 31 |
| 2.5 | 18 |
| 3.0 | 8.5 |

The lignite shale used in the above example was obtained from natural deposits thereof which are located near Gallup, New Mexico.

Example III

In this example lignite containing 37.6% by weight of humic acid was used. 1280 gallons of sodium hydroxide solution containing 50% by weight of NaOH was placed in a mixing tank and 1280 gallons of water mixed therewith. The resulting mixture was heated to 212° F. There-upon 32,000 lbs. of the lignite containing 34% by weight of moisture was slowly added to the solution at a rate of about 2 tons per hour over an 8 hour period. During this addition the temperature of the mixture was maintained at 212° F. by introduction of steam. Thereafter the mixture was digested for 4 hours at 220° F.

The resulting product was fed to a pair of drum dryers (faces of which were spaced 0.06 inch apart) which were heated by steam at a pressure to 90-100 lbs. per square inch. As a consequence, a dry granular product was obtained.

It will be understood that other alkali metal hyroxides including potassium hydroxide and lithium hydroxide may be used to produce drilling compositions of the type contemplated. However, it has been observed that the best results are obtained using sodium hydroxide and for this reason sodium hydroxide is found to be preferable. Occasionally, calcium hydroxide may be substituted in part or even in whole for the sodium hydroxide used. However, the products thus obtained appear to be more sensitive to variation in characteristics in drilling fluid, some drilling fluids being very satisfactorily treated with such material while others are not.

Although the present invention has been described with reference to the specific details of certain embodiments, it is not intended that such details shall be regarded as limitations upon the scope of the invention except insofar as included in the accompanying claims.

This application is a continuation-in-part of my copending applications Serial Nos. 114,461, filed September 7, 1949 and 169,182, filed June 22, 1950, the latter having now been abandoned.

What is claimed:

1. A solid, granular well treating composition comprising an alkali metal hydroxide and a carboniferous mineral containing at least 10 percent by weight of humic acid, said composition having been at least partially dehydrated by heating a mixture of alkali metal hydroxide, water, and the carboniferous mineral to produce a solid composition, the temperature of heating during at least a portion of the heating being above 90° C. but below the temperature at which substantial pyrolysis of the humic acid components occurs until a dry product has been obtained; the amount of alkali metal hydroxide in said composition being in excess of that required to react with the humic acid to produce a neutral product.

2. A solid, granular well treating composition which comprises a mixture of sodium hydroxide and a carboniferous mineral which contains at least 10 percent by weight of humic acid, said composition having been at least partially dehydrated by heating a mixture of sodium hydroxide, water, and said carboniferous mineral to produce a solid composition, the temperature during at least a portion of the heating being 150 to 350° C.; the amount of sodium hydroxide in said composition being in excess of that required to react with the humic acid to produce a neutral product.

3. A solid, granular well treating composition according to claim 1 where the carboniferous mineral is lignite shale.

4. A solid, granular well treating composition according to claim 2 wherein the carboniferous mineral is lignite shale.

5. A solid, granular well treating composition which comprises a mixture of sodium hydroxide and lignite shale, in the proportions of 0.1 to 3 parts by weight of sodium hydroxide per part of lignite shale said composition having been at least partially dehydrated by heating the mixture of sodium hydroxide, water, and the lignite shale at a temperature above 90° C. but below the temperature at which substantial pyrolysis of the lignite shale components occurs, until a dry product has been obtained.

6. A method of preparing a composition which comprises forming an aqueous dispersion of an alkali metal hydroxide and a carboniferous mineral which contains at least 10 percent humic acid and heating the mixture at a temperature above 90° C. but below the temperature at which substantial pyrolysis of the components of the carboniferous mineral occurs, until a dry product has been obtained; the amount of alkali metal hydroxide in said dispersion being in excess of that required to react with the humic acid to produce a neutral product.

7. The process of claim 6 wherein the dispersion is digested at 75 to 90° C. for at least 15 minutes prior to heating above about 90° C.

8. A method of preparing a composition which comprises forming an aqueous dispersion of sodium hydroxide and a carboniferous mineral which contains at least 10 percent by weight of humic acid, the amount of sodium hydroxide present being 0.1 to 3 parts by weight per part of the carboniferous mineral and heating the mixture at a temperature above 90° C. but below the temperature at which substantial pyrolysis of the components of the carboniferous mineral occurs, until a dry product has been obtained.

9. A method of preparing a composition which comprises forming an aqueous dispersion of sodium hydroxide and a carboniferous mineral which contains at least 10 percent by weight of humic acid, the amount of sodium hydroxide present being in excess of that required to react with the carboniferous mineral and heating the mixture at a temperature above 90° C. until a solid composition has been obtained.

10. A method of preparing a composition which comprises forming an aqueous dispersion of sodium hydroxide and a carboniferous mineral which contains at least 10 percent humic acid, the amount of sodium hydroxide being in excess of that required to react with the humic acid and produce a neutral product, and heating the mixture at a temperature of about 150 to 350° C. until a solid composition has been obtained.

11. The process of claim 6, wherein the aqueous dispersion of alkali metal hydroxide contains 5 to 55 per cent of NaOH.

12. The process of claim 10, wherein the aqueous dispersion of sodium hydroxide contains 5 to 55 per cent of NaOH.

13. A solid, granular well treating composition which comprises the reaction product of sodium hydroxide and a carboniferous mineral which has been prepared by heating lignite shale with aqueous sodium hydroxide containing 5 to 55 per cent by weight of NaOH, the proportions of shale to sodium hydroxide being 0.1 to 3 parts per part of lignite shale, at a temperature above 90° C. but below the temperature at which substantial pyrolysis of the components of the lignite shale occurs, until a solid product has been obtained.

14. The composition of claim 13, wherein the temperature of heating is 150 to 350° C.

15. In a process for drilling a well with well drilling tools wherein there is circulated a water base drilling mud containing clayey material suspended in sufficient aqueous medium to render the same circulatable, the method which comprises admixing with said mud and interacting therewith the composition defined by claim 9 in an amount sufficent to adjust the viscosity of the mud and to maintain the mud in a circulatable state and circulating the resulting mud through the well during drilling thereof.

16. A process of preparing a composition forming an aqueous mixture of sodium hydroxide and lignite in the proportion of 0.1 to 3 parts by weight of sodium hydroxide per part of lignite, and heating the mixture at a temperature above 90° C. and below that at which substantial pyrolysis of lignite components occurs until a solid product has been obtained.

17. In a process for drilling a well with well drilling tools wherein there is circulated an oil emulsion based drilling mud containing clayey materials suspended in sufficient fluid of oil and water emulsion to render the same circulatable, the method which comprises admixing with said mud and interacting therewith the composition defined by claim 9 in an amount sufficient to adjust the viscosity of the mud and to maintain the mud in a circulatable state, and circulating the resulting mud through the well during drilling thereof.

HENRY W. RAHN.

References Cited in the file of this patent

UNITED STATES PATENTS

| Number | Name | Date |
|---|---|---|
| 411,320 | Boogher | Sept. 17, 1889 |
| 958,893 | Ridenour | May 24, 1910 |
| 1,999,766 | Lawton et al. | Apr. 30, 1935 |
| 2,109,858 | Cannon | Mar. 1, 1938 |
| 2,211,688 | Byck | Aug. 13, 1940 |
| 2,376,885 | Sherwood | May 29, 1945 |
| 2,620,300 | Given | Dec. 2, 1952 |

OTHER REFERENCES

Lawton et al.: Chemical Treatment of Rotary Drilling Fluids, article in Physics, vol. 2, No. 5, pages 365 to 374, May 1932.

Stern: Role of Clay and Other Minerals in Oil-Well Drilling Fluids, Bureau of Mines Report of Investigations No. 3556, page 68, Feb. 1941.

Rogers: Composition and Properties of Oil Well Drilling Fluids, 1st edition, pub. 1948 by Gulf Pub. Co. of Houston, Texas, pages 291 and 292.